United States Patent
Dryselius et al.

(10) Patent No.: US 8,944,497 B2
(45) Date of Patent: Feb. 3, 2015

(54) SIDE TRACK FOR A VEHICULAR SUN ROOF

(71) Applicant: Volvo Car Corporation, Goeteborg (SE)

(72) Inventors: Joakim Dryselius, Vaestra Froelunda (SE); Peder Soederstroem, Goeteborg (SE)

(73) Assignee: Volvo Car Corporation (SE)

( * ) Notice: Subject to any disclaimer, the term of this patent is extended or adjusted under 35 U.S.C. 154(b) by 0 days.

(21) Appl. No.: 13/893,559

(22) Filed: May 14, 2013

(65) Prior Publication Data
US 2013/0307294 A1 Nov. 21, 2013

(30) Foreign Application Priority Data
May 16, 2012 (EP) .................................... 12168229

(51) Int. Cl.
*B60J 7/02* (2006.01)
*B60R 21/055* (2006.01)
*B60R 21/02* (2006.01)

(52) U.S. Cl.
CPC . *B60J 7/02* (2013.01); *B60R 21/055* (2013.01)
USPC .................. 296/216.08; 296/187.05; 280/748

(58) Field of Classification Search
CPC ................................. B60J 7/02; B60R 21/055
USPC ............ 296/216.06–216.08, 187.05; 280/748
See application file for complete search history.

(56) References Cited

U.S. PATENT DOCUMENTS

| | | | | |
|---|---|---|---|---|
| 5,100,197 | A * | 3/1992 | Ichinose et al. | 296/216.04 |
| 5,188,420 | A * | 2/1993 | Maeda et al. | 296/223 |
| 5,988,736 | A * | 11/1999 | Kralik et al. | 296/216.06 |
| 6,196,625 | B1 * | 3/2001 | Nagashima et al. | 296/213 |
| 6,364,407 | B1 * | 4/2002 | Raisch et al. | 296/216.06 |
| 6,550,853 | B2 * | 4/2003 | Wingen et al. | 296/216.03 |
| 7,914,072 | B2 * | 3/2011 | Queener et al. | 296/210 |
| 7,922,242 | B2 * | 4/2011 | Comfort et al. | 296/216.08 |
| 8,118,357 | B2 * | 2/2012 | Hotta et al. | 296/216.08 |

FOREIGN PATENT DOCUMENTS

| | | |
|---|---|---|
| DE | 102005046901 A1 | 4/2007 |
| JP | 2003-237477 * | 3/2003 |
| NL | 6807210 A | 11/1969 |
| WO | 2008034433 A1 | 3/2008 |

OTHER PUBLICATIONS

Extended European Search Report Dated Jul. 31, 2012, Applicant Volvo Car Corporation, Application No. 12168229.8-1268, 5 Pages.

* cited by examiner

*Primary Examiner* — Dennis H Pedder
(74) *Attorney, Agent, or Firm* — Brooks Kushman P.C.

(57) ABSTRACT

A side track for a vehicular sun roof comprises a first portion having a longitudinal extension for supporting the sun roof, and a second portion extending side by side, and connected to, at least a part of the first portion. Furthermore, at least a part of the second portion is arranged to pivot in relation to the first portion in order to absorb impact energy from a colliding object. A sun roof arrangement comprising such a side track, and a vehicle comprising such a sun roof arrangement or side track are also provided.

15 Claims, 5 Drawing Sheets

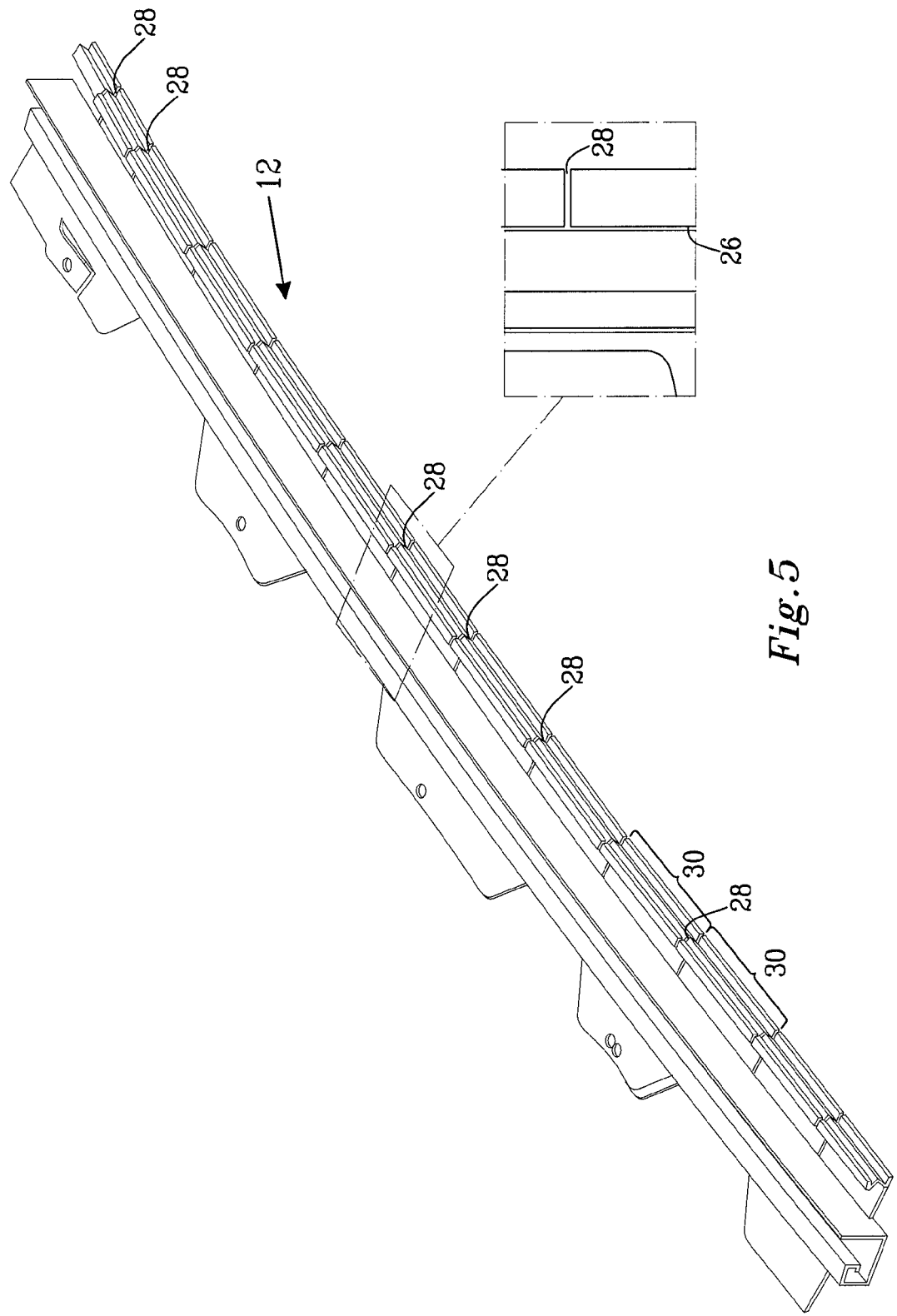

SIDE TRACK FOR A VEHICULAR SUN ROOF

CROSS-REFERENCE TO RELATED APPLICATIONS

This application claims foreign priority benefits under 35 U.S.C. §119(a)-(d) to European patent application number EP 12168229.8, filed May 16, 2012, which is incorporated by reference in its entirety.

TECHNICAL FIELD

The present disclosure relates to a side track for a vehicular sun roof. The disclosure further relates to a sun roof arrangement and a vehicle comprising the side track.

BACKGROUND

A vehicle, such as a car, may be provided with a sun roof. The term sun roof as used herein comprises a sun roof, a panorama roof or a moon roof. Normally there is a side track at each lateral side of the sun roof supporting the sun roof. Further the sun roof may be openable, e.g., by having at least one movable panel, which may be slid above or below the roof of the vehicle in order to open the sun roof. The panel then moves in the side track, which forms a guide for the sliding movement of the movable panel, such that the movable panel may be slid longitudinally in relation to the vehicle. Alternatively, the sun roof may be non-openable. The side tracks are mechanically stable in order to be able to support the sun roof.

Under unfavorable conditions, e.g., in case of an accident involving an unbelted person in the vehicle, the head of the person may impact with the side track and suffer a head injury. In order to mitigate the consequences of such a head impact, it is known to use inserts, e.g., of plastic foam, between the side track and a covering forming the ceiling of the passenger compartment. In case of a head impact, the insert will absorb impact energy and thus reduce the consequences of the head impact. However, the insert occupies space, thus reducing the passenger compartment headroom. Further, the interior opening of the sun roof may be reduced due to the insert. Since the insert is an additional part, it will cost both money and extra work during assembly of the ceiling module comprising the side track.

Document DE 10 2005 046 901 A1 discloses a sun roof arrangement comprising side tracks for guiding an openable sun roof. A side of each side track facing the passenger compartment is covered with an energy absorbing unit. The energy absorbing unit is directly connected with the side track, e.g., by using a clip connection. The energy absorbing unit and the side track thus form a single component. The text mentions that the energy absorbing unit is thinner than according to prior art technology using plastic foam inserts. In case of a head impact, there will be a directed deformation of the energy absorbing unit. Thereby the impact energy is at least partly absorbed, reducing the consequence of the head impact. However, also the solution presented in DE 10 2005 046 901 A1 will occupy compartment headroom, although less than according to prior art.

SUMMARY

An object of the present disclosure is to overcome or ameliorate at least one of the disadvantages of the prior art, or to provide a useful alternative.

It is desirable to provide a side track being able to mitigate the consequences of a head impact, yet occupying as little as possible of the passenger compartment headroom.

It is further desirable to provide a side track making a larger interior sun roof opening possible than with prior art side tracks.

It also desirable to provide a side track making it possible to lower the manufacturing cost of a sun roof arrangement comprising side tracks.

Thus, in a first aspect of the present disclosure there is provided a side track for a vehicular sun roof comprising a first portion having a longitudinal extension for supporting the sun roof, and a second portion extending side by side, and connected to, at least a part of the first portion, wherein at least a part of the second portion is arranged to pivot in relation to the first portion in order to absorb impact energy from a colliding object.

The first and second portions extend in parallel to each other, side by side. They are connected to each other, e.g., by forming one integral unit, or by being welded, spot-welded and/or glued to each other.

When mounted in a vehicle, the sun roof is located in the roof of the vehicle. If there is a person sitting unbelted in the vehicle, there is a risk, e.g., in case of an accident involving the vehicle, that the unbelted person is thrown towards the sun roof in such a way that his/her head impacts with the side track. However, the side track according to the disclosure is pre-configured to move by pivoting, thereby absorbing energy from the impact. Further, the pivotal movement will move the pivoting part in the same direction as the impacting head, thus partly moving this part out of the way of the impacting head.

The colliding object is thus coming from the interior of the vehicle when the sun roof is mounted in the vehicle. The colliding object is typically a head, e.g., of an unbelted person in the passenger compartment, but may also be another body part.

Since the pivotal movability is integrated into the second portion, no additional component is necessary for absorbing impact energy. This results in less reduction of compartment headroom as compared to prior art solutions. Further, the interior sun roof opening may be larger than for prior art solutions. The manufacturing cost may be reduced and assembly of the ceiling module comprising the side track may be easier.

In an embodiment, the pivoting movement of the part of the second portion, or the whole second portion, in relation to the first portion substantially maintains the structural integrity of the first and second portions at least during the initial phase of the pivoting. Hence, there is during the initial phase of the pivoting substantially no, or only negligible, deformation of the first and second portion. However, eventually, during the end of the impact progress, the second portion may be deformed as well.

The first portion may be adapted to be attached to the roof of the vehicle. The first portion may be part of a frame structure supporting the sun roof. The frame structure may help retaining the sun roof, such that it is not lifted by a lifting force when the vehicle is moving. Further, the frame structure may be configured to withstand loads during a collision scenario involving the vehicle.

If the sun roof is openable, the first portion may be adapted to guide the sun roof during the opening movement. As an example a movable panel of the sun roof may be sliding in a channel of the first portion in order to open the sun roof.

The second portion may comprise an attachment channel and/or a roller blind guide extending substantially parallel to the longitudinal extension of the first portion. The attachment channel is adapted to attach the ceiling of the passenger compartment to the side track. The roller blind guide is adapted to receive a roller blind being used for sun shading when desired. The roller blind is slid in the roller blind guide. Other sun-shading means are also possible, such as sun-shade panels adapted to be stacked on top of each other during storage or a lid, which is manually retractable.

The roller blind weighs much less than a sun roof. In addition, the second portion is normally not adapted to support the sun roof or to withstand the above-mentioned lifting forces or collision forces and may thus be of a weaker construction than the first portion, e.g., having a lower wall thickness.

In an embodiment, the second portion comprises at least one weak zone arranged such that the pivoting of the at least a portion of the second portion in relation to the first portion occurs about the at least one weak zone. Further, the at least one weak zone may comprise a plurality of weak zones located after each other, along a line, similar to a perforation in a paper roll. The weak zone may be constituted by a wall thickness being less than the remaining wall thickness of the second portion, i.e., an indent or a groove. It is also possible using one or more apertures and/or one or more slots as a weak zone. The weak zone may also comprise a cavity formed within the second portion.

The at least one weak zone may extend substantially parallel to the longitudinal extension of the first portion of the side track. Thereby the pivotable part of the second portion will pivot along a pivot axis running parallel to the first portion. The weak zone may extend along the whole length of the side track or a portion of the length.

The at least one weak zone may extend along at least a portion of an interface between the first portion and the second portion. The pivotal movement will then be along this interface, resulting in that the whole cross-section of the second portion may pivot in case of an impact.

In case the side track comprises both an attachment channel and a roller blind guide, the at least one weak zone may extend along at least a portion of an interface between the attachment channel and the roller blind guide.

The second portion may comprise more than one weak zone, e.g., one in the interface between the first and second portions and another in the interface between the attachment channel and the roller blind guide. In case of an accident, the side track may pivot about one or more of these weak zones, depending on where the impact is located.

As a complement, or an alternative, the at least one weak zone may extend substantially perpendicular to the longitudinal extension of the first portion. For example, at least one weak zone may extend substantially parallel to the longitudinal extension of the first portion and at least one weak zone may extend substantially perpendicular to the longitudinal extension of the first portion.

The side track may comprise a plurality of perpendicular weak zones extending substantially perpendicular to the longitudinal extension of the first portion. They may be at a distance of between 10 and 200 mm from each other, preferably at a distance of between 20 and 120 mm from each other. The perpendicular weak zones divide the second portion into a number of sections. If a head impacts on the second portion from below, only a few sections, normally one or two, will be influenced, since the second portion will not only pivot about the longitudinal weak zone, but also pivot about the perpendicular weak zones being adjacent to the impact. The use of perpendicular weak zones is for example appropriate for a vehicle having a roof profile being slightly curved in the longitudinal direction of the vehicle.

The side track may be manufactured in one piece. It may be of metal. It may be an extruded profile, preferably an extruded aluminum profile. The weak zone may be formed during extrusion, which is especially suitable for the case the weak zone extends parallel to the first portion of the side track and thus in the longitudinal direction of the side track.

As an alternative, the side track may be made of a polymer, e.g., a thermo-moulded polymer. In that case the whole side track may be moulded at the same time. Alternatively, the second portion may be made of a polymer and the first portion of a metal, such as aluminum.

The weak zone may be formed by a locally reduced wall thickness of the second portion. As mentioned above, the reduced wall thickness may be formed during extrusion of the side track.

As an alternative or a complement, the weak zone may be formed by a milled and/or punched groove, an indent, an aperture, a slot or the like. This is for example suitable for weak zones extending perpendicularly. The weak zone may comprise a plurality of grooves, indents, apertures, slots or the like located after each other along a line, similar to a perforation in a paper roll.

In principle the weak zone may extend in an arbitrary direction in the second portion of the side track. There may also be weak zones in the first portion. However, since the first portion is used to support the sun roof, it is appropriate to locate the weak zone in the second portion or in the interface between the first portion and the second portion in order not to compromise with the stability requirement of the support of the sun roof.

In a second aspect of the present disclosure there is provided a sun roof arrangement for a vehicle comprising a sun roof and a pair of side tracks according to above, wherein a first portion of each of the pair of side tracks is arranged to support the sun roof. The side track may further guide the sun roof during sliding movement in order to open the sun roof in case the sun roof is openable.

The sun roof arrangement is intended to be mounted in a vehicle, e.g., a car, such that the second portion of the side track, which portion may pivot in case of an impact, is located closest to the head of the person sitting in the vehicle.

In a third aspect of the present disclosure there is provided a vehicle comprising a side track according to above or a sun roof arrangement comprising such a side track.

BRIEF DESCRIPTION OF THE DRAWINGS

The present disclosure will hereinafter be further explained by means of non-limiting examples with reference to the appended drawings wherein:

FIG. 5 is a cross-sectional view of a side track according to a second embodiment of the disclosure.

It should be noted that the appended drawings are not necessarily drawn to scale and that the dimensions of some features of the present disclosure may have been exaggerated for the sake of clarity.

DETAILED DESCRIPTION

The disclosure will, in the following, be exemplified by non-limiting embodiments. Details from two or more of the embodiments may be combined with each other.

Figure 1:
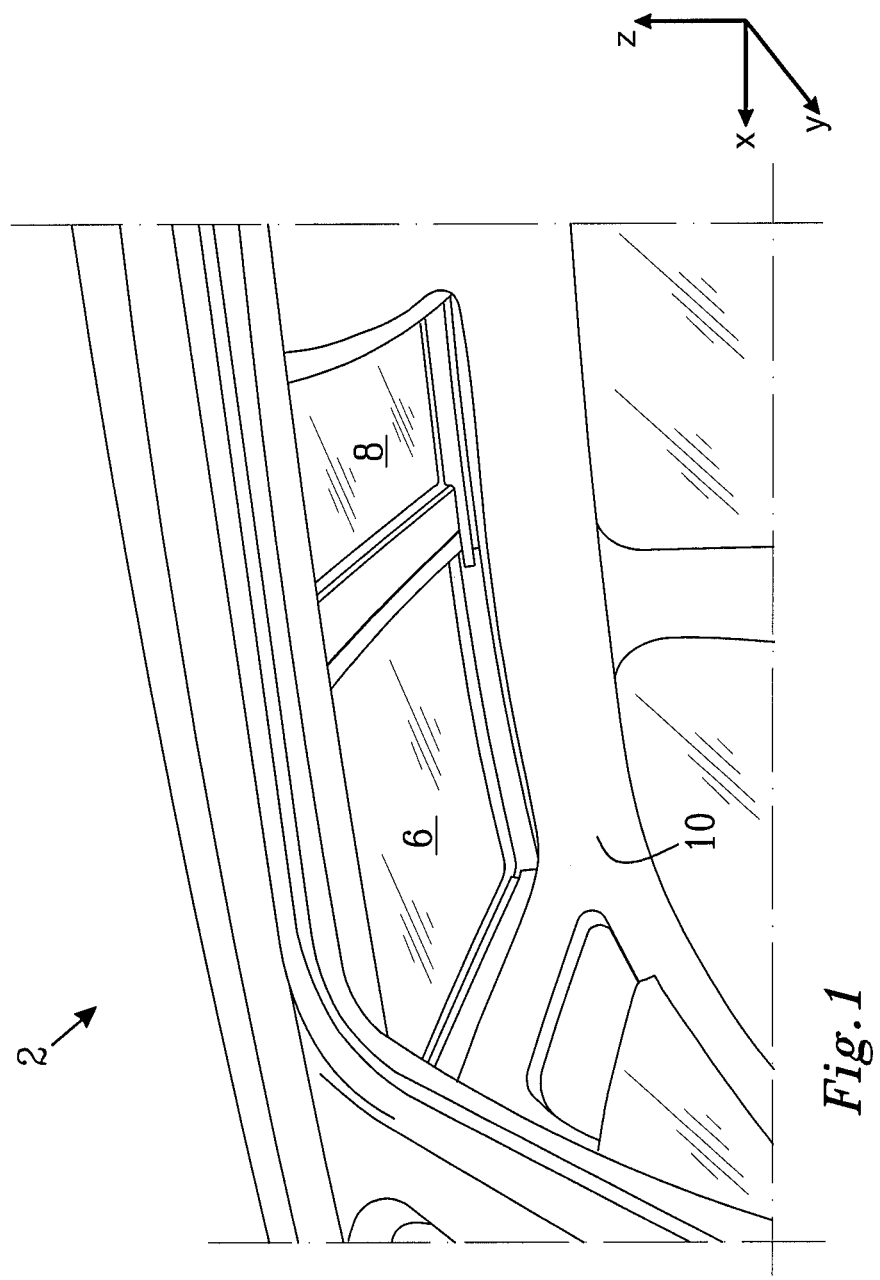
FIG. 1 is a perspective view of a portion of a vehicle with a sun roof arrangement.
Figure 2:
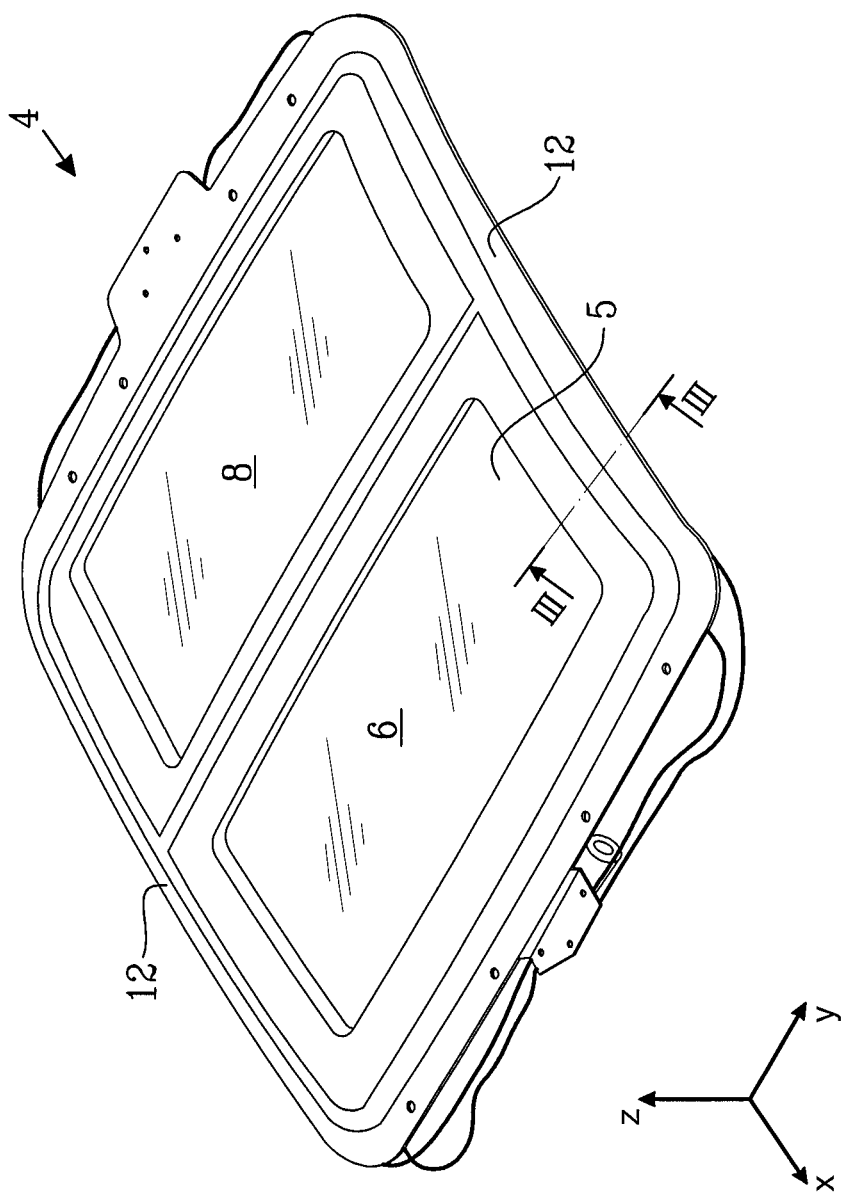
FIG. 2 is a perspective view of the sun roof arrangement.

FIG. 1 schematically illustrates a portion of a vehicle 2 with a sun roof arrangement 4. FIG. 2 illustrates the sun roof arrangement 4 removed from the vehicle in order to see details hidden in FIG. 1. In this example, the sun roof arrangement 4 is openable.

The vehicle 2 has a longitudinal direction x, a lateral direction y and a height direction z. The sun roof arrangement 4 comprises sun roof 5 having a first panel 6 and a second panel 8, which panels 6, 8 may be at least partly transparent. The first panel 6 may slide in a rearward direction along the longitudinal direction x of the vehicle 2 below or above the second panel 8 in order to provide an opening (not illustrated) in the roof of the vehicle 2. During the sliding movement, the first panel 6 is guided by a first portion of a side track 12, which will be further described below. There are two side tracks 12, one along each lateral side of the sun roof 5. In FIG. 1, the side tracks 12 are covered by a covering 10 forming a ceiling of the passenger compartment and can thus not be seen.

The sun roof arrangement 4 is slightly curved following the shape of the roof of the vehicle 2. Therefore the side tracks 12, which form part of the sun roof arrangement 4, are not perfectly straight, but follow the shape of the roof of the vehicle 2.

Figure 3:
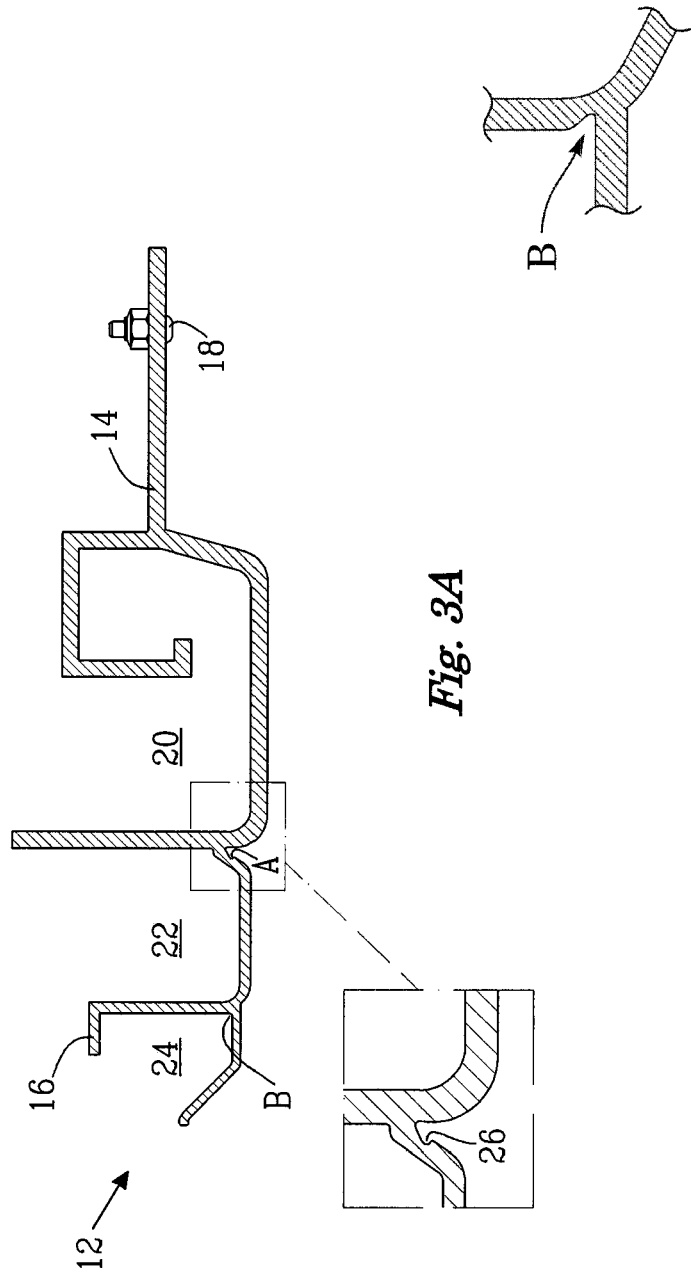
FIG. 3A is a cross-sectional view of a side track according to a first embodiment of the disclosure in a normal state.
FIG. 3B is an enlarged, fragmentary cross-sectional view of a portion of the side track.

FIG. 3A is a cross-section through one of the side tracks 12. The side track 12 comprises a first portion 14 and a second portion 16, which extend side by side to each other and are connected to each other. The side track 12 is preferably manufactured in one unit, for example as an extruded aluminum profile, as shown in FIG. 3A, wherein the second portion 16 has been formed with a thinner wall thickness than the first portion 14 of the side track 12.

The first portion 14 is adapted to be attached to the roof of the vehicle 2, e.g., by a bolt and nut connection 18 or a screw. The first portion 14 is part of a frame structure supporting the sun roof 5. Further, for this embodiment illustrating an openable sun roof 5, the first portion 14 is adapted to guide the first panel 6 during the sliding movement. The first portion 14 therefore comprises a guiding channel 20 in which a corresponding portion of the first panel 6 fits. The first portion 14 may further be adapted for receiving an element for sealing the sun roof, such as a sealing strip.

In case the sun roof is not openable (not illustrated) the sun roof comprises a channel corresponding to the guiding channel, which channel is used to support the sun roof The second portion 16 comprises an attachment channel 22 and a roller blind guide 24. The attachment channel 22 is adapted to attach the ceiling of the passenger compartment to the side track 12, e.g., by a plurality of bolt and nut connections, clips or screws (not illustrated). The roller blind guide 24 is adapted to receive a roller blind (not illustrated) being used for sun shading when desired. The roller blind is slid in the roller blind guide 24. Since the roller blind weighs much less than the sun roof 5, the second portion 16 may be a less rigid construction than the first portion 14, e.g., having a lower wall thickness. In addition, the second portion 16 is normally not adapted to support the sun roof 5 or to withstand the above-mentioned lifting forces or collision forces.

FIG. 3A further illustrates that a weak zone 26 is located along an interface A between the first portion 14 and the second portion 16. The weak zone 26 may extend along the whole length of the second portion 16 or a portion of the length. Further, the weak zone 26 may comprise a plurality of weak zones located after each other along the interface A between the first portion 14 and the second portion 16, similar to a perforation in a paper roll. If the side track 12 is manufactured in one unit, for example as the extruded aluminum profile shown in FIG. 3A, the weak zone 26 may be formed when extruding the profile of the side track 12 as a section with reduced wall thickness. Alternatively, the weak zone 26 may be punched or milled.

Alternatively, or in addition, there may be another weak zone along the interface B between the attachment channel 22 and the roller blind guide 24, as shown in FIG. 3B. In that case, there may be a pivotal movement about a pivot axis extending along that weak zone. There may also be pivotal movements about more than one weak zone at the same time in case of an impact, e.g., both around the interface A and the interface B.

There may also be a weak zone located in the first portion 14. However, as explained above, the first portion 14 is used to support the sun roof 5, and it is thus appropriate to locate the weak zone in the second portion 16 or in the interface between the first portion 14 and the second portion 16.

Figure 4:
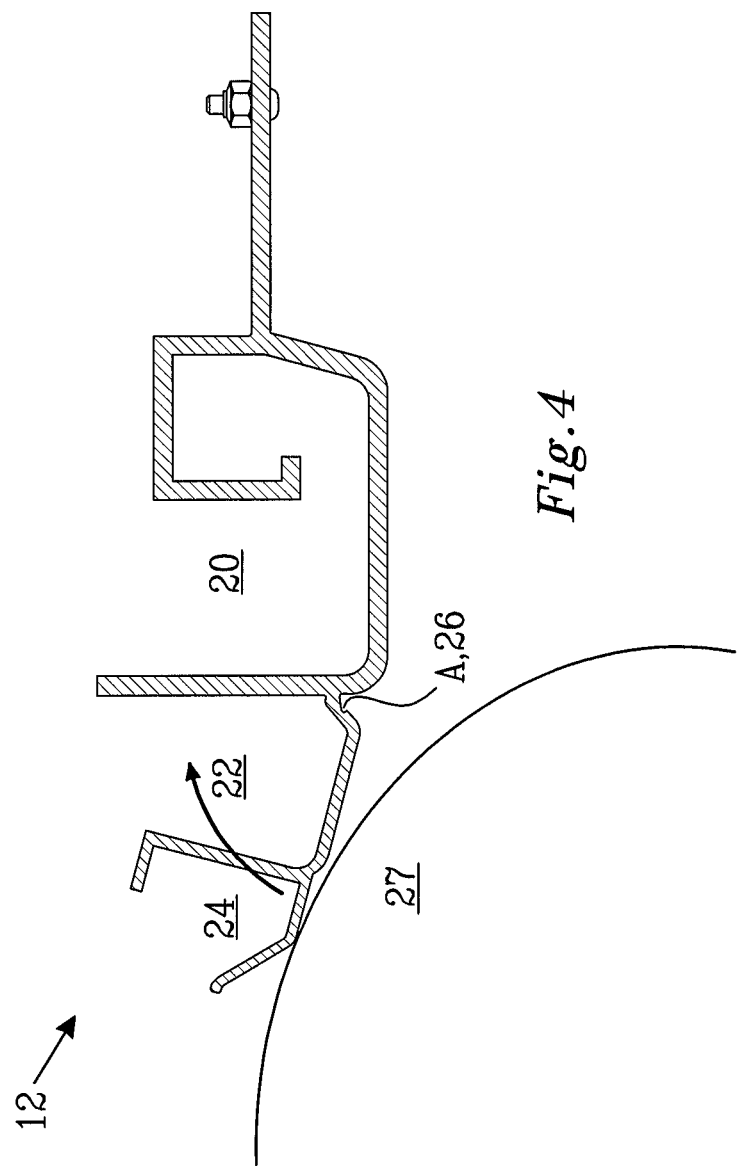
FIG. 4 is a cross-sectional view of the side track of FIG. 3A after an impact from below.

FIG. 4 shows what happens if the side track 12 is hit by an object from below, e.g., a head 27. This may happen if a person sits unbelted and is thrown towards the ceiling in case of an accident. Most likely the head 27 will hit the side track 12 at the second portion 16, which is most adjacent to the head 27 of the person, when sitting in the vehicle. Due to the location of the weak zone 26, the second portion 16 will pivot about a pivot axis extending along the weak zone 26. See the arrow in FIG. 4 indicating the pivotal movement. The side track 12 is thus preconfigured to move by pivoting. The pivotal movement of the second portion 16 will move the second portion 16 in the same direction as the impacting head 27, thereby absorbing impact energy. Some of the impact energy will be absorbed by deformation of the material of the weak zone 26. Eventually, the second portion 16 may be deformed as well.

FIG. 5 illustrates a second embodiment of the disclosure, wherein the side track 12 both has a longitudinal weak zone 26 as in FIG. 3A and a plurality of perpendicular weak zones 28 extending in the second portion 16 in the lateral direction y of the vehicle, when the sun roof arrangement is mounted in the vehicle. They are typically at a distance of between 10 and 200 mm from each other, preferably at a distance of between 20 and 120 mm from each other. The perpendicular weak zones 28 divide the second portion 16 into a number of sections 30. If a head 27 impacts the second portion 16 from below, only a few sections 30 will be influenced, e.g., one or two where the head is hitting, since the second portion 16 will not only pivot about the longitudinal weak zone 26, but also pivot about the perpendicular weak zones 28 being adjacent to the impact.

The second embodiment is for example appropriate for a vehicle having a roof profile being slightly curved in the longitudinal direction of the vehicle. Due to the curvature of the side track following the roof profile, a weak zone in the interface between the first portion and the second portion would in such a case not form a straight line. However, if only a few sections of the side track are involved, the curvature of the side track may locally be neglected, and the weak zone may be approximated with a straight line forming a pivot axis. The second portion 16 will then not only pivot about the longitudinal weak zone 26, but also pivot about the perpendicular weak zones 28 being adjacent to the impact.

If the side track 12 is made as an extruded profile, e.g., of aluminum, the perpendicular weak zones 28 may be formed as milled or punched grooves, indents, apertures, slots or the like.

Further modifications of the disclosure within the scope of the appended claims are feasible. As such, the present invention should not be considered as limited by the embodiments and figures described herein. Rather, the full scope of the invention should be determined by the appended claims, with reference to the description and drawings.

What is claimed is:

1. A side track for a vehicular sun roof, the side track comprising:
    a first portion having a longitudinal extension for supporting the sun roof; and
    a second portion extending side by side, and connected to, at least a part of the first portion;
    wherein the second portion comprises multiple weak zones that are each configured to allow at least a part of the second portion to pivot in relation to the first portion in order to absorb impact energy from a colliding object, wherein the multiple weak zones include at least one weak zone that extends substantially parallel to the longitudinal extension of the first portion and at least one weak zone that extends substantially perpendicular to the longitudinal extension of the first portion.

2. The side track according to claim 1 wherein the second portion comprises an attachment channel and/or a roller blind guide extending substantially parallel to the longitudinal extension of the first portion.

3. The side track according to claim 1 wherein at least one of the weak zones extends along at least a portion of an interface between the first portion and the second portion.

4. The side track according to claim 1 further comprising an attachment channel and a roller blind guide, wherein at least one of the weak zones extends along at least a portion of an interface between the attachment channel and the roller blind guide.

5. The side track according to claim 1 wherein the at least one weak zone that extends substantially perpendicular to the longitudinal extension of the first portion comprises a plurality of weak zones that each extend substantially perpendicular to the longitudinal extension of the first portion.

6. The side track according to claim 1 wherein the side track is made in one piece.

7. The side track according to claim 1 wherein the side track is an extruded profile.

8. The side track according to claim 7 wherein the extruded profile is an extruded aluminum profile.

9. The side track according to claim 1 wherein each of the weak zones is formed by a locally reduced wall thickness of the second portion.

10. The side track according to claim 1 wherein each of the weak zones is formed by a milled and/or punched groove, an indent, an aperture, or a slot.

11. A sun roof arrangement for a vehicle comprising a sun roof and a pair of side tracks according to claim 1, wherein the first portion of each of the pair of side tracks is arranged to support the sun roof.

12. A vehicle comprising:
    a sun roof; and
    a side track for the sun roof, the side track including:
        a first portion having a longitudinal extension for supporting the sun roof; and
        a second portion extending side by side, and connected to, at least a part of the first portion;
        wherein the second portion comprises multiple weak zones that are each configured to allow at least a part of the second portion to pivot in relation to the first portion in order to absorb impact energy from a colliding object, and wherein the multiple weak zones include at least one weak zone that extends substantially parallel to the longitudinal extension of the first portion and at least one weak zone that extends substantially perpendicular to the longitudinal extension of the first portion.

13. The vehicle according to claim 12 further comprising an additional side track arranged to support the sun roof, wherein the side tracks are disposed on opposite lateral sides of the sun roof.

14. A side track for a vehicular sun roof, the side track comprising:
    a first portion having a longitudinal extension for supporting the sun roof; and
    a second portion extending side by side, and connected to, at least a part of the first portion;
    wherein the second portion comprises multiple weak zones that are each configured to allow at least a part of the second portion to pivot in relation to the first portion in order to absorb impact energy from a colliding object, and each of the weak zones comprises a groove formed in a wall of the second portion such that the wall has a locally reduced thickness, and wherein the multiple weak zones include at least one weak zone that extends substantially parallel to the longitudinal extension of the first portion and at least one weak zone that extends substantially perpendicular to the longitudinal extension of the first portion.

15. The side track according to claim 14 wherein the at least one weak zone that extends substantially perpendicular to the longitudinal extension of the first portion comprises a plurality of weak zones that each extend substantially perpendicular to the longitudinal extension of the first portion.

* * * * *